United States Patent [19]

McVeigh, Jr. et al.

[11] Patent Number: 4,707,421
[45] Date of Patent: Nov. 17, 1987

[54] SPIRALLY WOUND ELECTROCHEMICAL CELLS

[75] Inventors: James B. McVeigh, Jr., Norwood; Terrence F. Reise, Sudbury; Alwyn H. Taylor, Wellesly Hills, all of Mass.

[73] Assignee: Duracell Inc., Bethel, Conn.

[21] Appl. No.: 729,727

[22] Filed: May 2, 1985

[51] Int. Cl.⁴ .............................................. H07M 4/00
[52] U.S. Cl. ...................................... 429/94; 429/164
[58] Field of Search .................................... 429/99, 164

[56] References Cited

U.S. PATENT DOCUMENTS

| | | | |
|---|---|---|---|
| 3,298,871 | 1/1967 | Binder et al. | 429/94 |
| 3,304,203 | 2/1967 | Norduik | 429/94 |
| 4,121,019 | 10/1978 | Garrett | 429/94 |
| 4,454,208 | 6/1984 | Osmialowski | 429/94 X |
| 4,476,202 | 10/1984 | Wesner | 429/94 |
| 4,550,064 | 10/1985 | Yen et al. | 429/94 |

Primary Examiner—Brian E. Hearn
Assistant Examiner—Stephen J. Kalafut
Attorney, Agent, or Firm—Ronald S. Cornell; James B. McVeigh

[57] ABSTRACT

The invention relates to spirally wound electrochemical cells in which the anode tab is located on a section of the anode that is sandwiched on both sides by cathode. This eliminates or minimizes problems normally associated with voltage reversal.

14 Claims, 4 Drawing Figures

SPIRALLY WOUND ELECTROCHEMICAL CELLS

FIELD OF THE INVENTION

This invention relates to electrochemical cells of a spirally wound electrode design. More specifically, the invention pertains to a new design in which the location of the anode tab is positioned to afford a cell which is less subject to voltage reversal problems.

DESCRIPTION OF THE RELATED ART

When electrochemical cells are connected in series to form a battery the potential exists for one of these cells, during discharge, to undergo voltage reversal. In the cell which experiences voltage reversal the voltage of the cathode is driven to a value that is negative of the anode voltage. This phenomena initiates a new discharge reaction. The anode continues to oxidize, as during normal discharge, but the cathode does not get reduced. Instead, a new reaction takes place on the surface of the solid cathode where the cations of the electrolyte get reduced. This new reaction causes the metallic anode material to electrochemically plate onto the cathode and this plating process continues as long as the cell is held in voltage reversal. As plating continues the deposit becomes less uniform and dendrites of anode material begin to form and grow back toward the anode. Eventually a dendrite can grow back through the separator and make physical, and therefore electrical, contact to the anode. This dendrite bridge between the anode and cathode provides a very low resistance pathway and effectively causes an internal short. As soon as this happens a tremendous amount of current surges through the dendrite. This surge of current, which can be viewed as an input of power or heat through the dendrite, initiates a reaction between the cathode and the anode material plated on it. The net result is thermal runaway of the cell. This scenario becomes more likely when very thin (1-2 mil) separators are used as is typical in high energy density electrochemical cells.

There have been attempts to minimize the problems of high energy density spirally wound cells during voltage reversal. For example, U.S. Pat. No. 4,450,213 discloses sandwiching a piece of copper foil down the entire length of and between two sections of anode material. Such embodiments are disclosed to reduce the problems inherent during voltage reversal abuse. Drawbacks to such embodiments are that their use diminishes the amount of active material that can be put in the cell. It also adds an additional step in the manufacture of these cells to incorporate these strips into the anode construction. Therefore it is an object of this invention to provide a cell which is safe under voltage reversal, which has maximum volumetric capacity, and which is relatively easy to manufacture.

BRIEF DESCRIPTION OF DRAWINGS

It is an object of the present invention to provide spirally wound electrochemical cells having solid active cathode material, such cells being inherently safe under abuse conditions such as the voltage reversal scenario described above. This and other objects, features, and advantages of the present invention will become more evident from the following discussion and drawings in which.

DETAILED DESCRIPTION OF THE INVENTION

Figure 1:
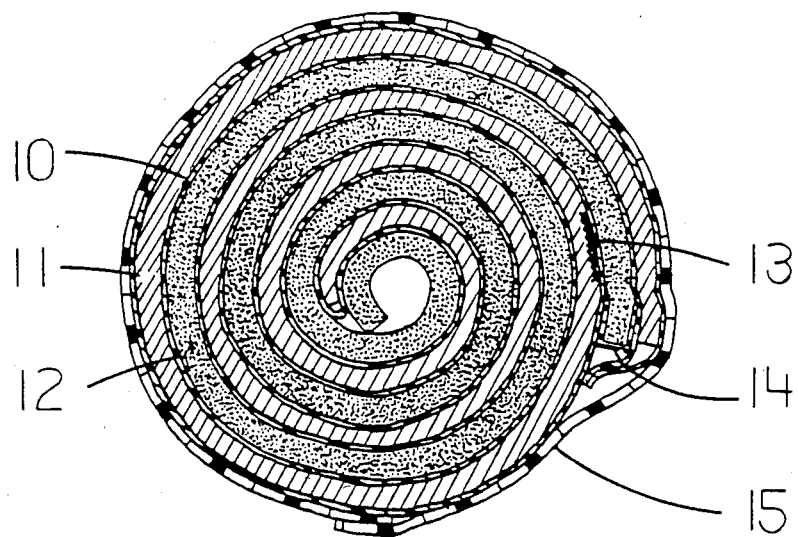
FIG. 1 is a cross section view of a spirally wound electrode package of the preferred embodiment.

Spirally wound electrodes are a common design feature in electrochemical cells that are intended for high rate applications. During discharge, ions from the anode must diffuse into the cathode in order to maintain charge balance in the system. This process contributes to the overall polarization of the cell during discharge. To reduce polarization it is desirable to minimize the distances over which these ions must diffuse. In a spirally wound cell this is achieved by ensuring that the cathode has anode on both sides of it. This results in the anode being the electrode of the outside wrap. FIG. 1 depicts such a configuration.

Figure 4:
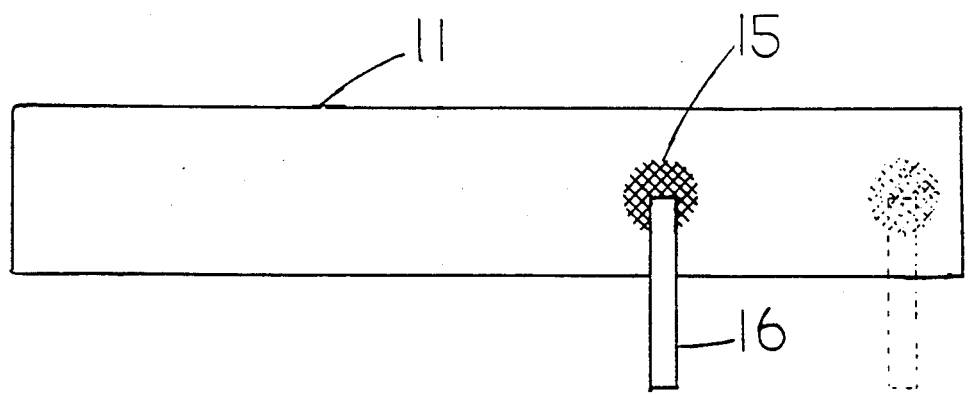
FIG. 4 shows the anode tab positioned on the anode strip.

Electrical contact between the electrodes and the terminals of the cell is of course necessary and can be accomplished by any of the well known conventional methods. One method for making contact to the anode is typically to weld one end of a piece of thin metallic material to the anode surface while the other end is mechanically contacted, welded, or otherwise attached to the cell can. FIG. 4 shows one embodiment of an anode tab suitable for use in the presently disclosed invention. The tab consists of a disc 15 of expanded metal screen having a strip of thin metal foil 16 spot welded to it. The expanded metal disc portion is welded to the surface of the anode. The extended tab 16 is attached to the cell can or cover to make electrical contact.

For a spirally wound cell it has heretofor been the practice to locate the tab somewhere on the outer surface of the outside wrap of anode. Locating the tab there simplifies the winding procedure during manufacture of the cell. This location also ensures that the tab cannot short through the separator to the cathode which is a possibility for any other location. The anode of this cell has two sections which have different rates of utilization when the cell is discharged. There is one section of anode which has cathode on both sides and one section which has cathode on one side. At any point during discharge the section with cathode on one side will be thicker than the section with cathode on both sides. Eventually all that is left of the anode is the outer wrap. It is also on this section where the tab is located. When such a cell is driven into voltage reversal the outside wrap of anode acts as a reservoir of anode material which plates onto the cathode. This plating process eventually causes a dendrite to grow and short out to the anode. Current then passes through the short created by the dendrite, heat builds up, and a very rapid reaction takes place between the cathode and the plated anode material, in a worst case scenario thermal runaway of the cell results. This scenario holds true for any electrochemical cell in which the anode/active cathode combination is spirally wound and the anode tab is located on the outside wrap of anode. Although attaching the anode tab at this position is desirable from a manufacturing point of view, we have discovered that protection from voltage reversal problems can be obtained by attaching the anode tab at a different location.

Referring now to the drawings in detail. FIG. 1 shows an anode 11, a cathode 12, and a separator 10 spirally wound together. FIGS. 1 and 4 show the anode tab 13 of the preferred location while just FIG. 4 shows this position relative to the prior art location (dotted line portion). There are two sections of anode 11 which get utilized at different rates during discharge as discussed previously. The difference over the prior art is that the tab 13 is no longer attached to the thicker section of anode. When this cell goes into voltage reversal the section of anode 11 connected to tab 13 is nearly totally discharged. In fact it thins to the point that the outer wrap of anode becomes electrically disconnected. Thereafter the outside wrap cannot act as a reservoir of anode material to plate onto the cathode. The section of the anode that is connected to the tab is sufficiently thin that there is not enough anode material to form a dendrite and cause an internal short. The result is a much safer cell during voltage reversal.

Figure 2:
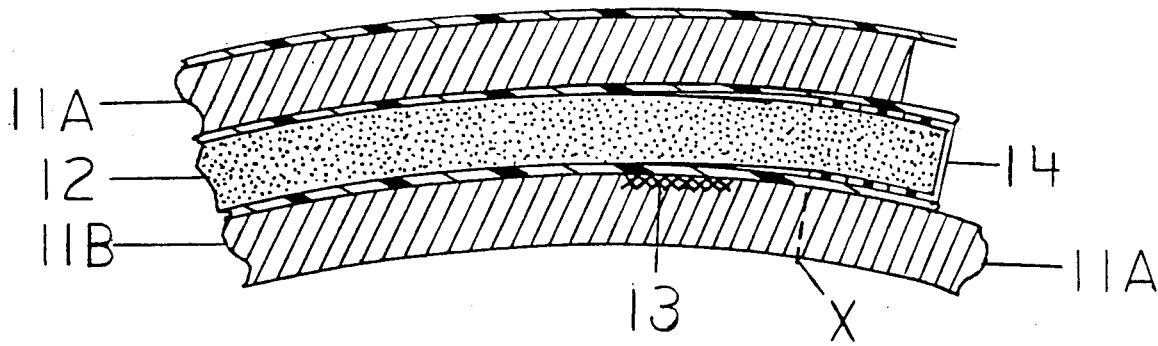
FIG. 2 is an enlarged view of that area of the spirally wound electrode package where the anode tab is preferably located.

In a preferred embodiment of this invention a piece of ionically impermeable film 14 is deposed around the end of the cathode 12 as shown in FIGS. 1 and 2. This film can be formed from any ionically impermeable and non-conductive material. Such material can be adhesive or non-adhesive. Suitable materials include polyester, vinyl, cellophane, ultra high molecular weight polyethylene, ultra-high molecular weight polyprylene, Teflon, or Teflon filled glass. It is preferable, from a manufacturing standpoint, that these films have an adhesive. Suitable adhesives include acrylic, silicone, or rubber. This film causes the anode 11 to prematurely break at the point X in FIG. 2 as the cell is discharged or driven into voltage reversal. The cathode which is masked by the film cannot get discharged by the anode across from it because the film is ionically impermeable. The masked end of the cathode instead gets discharged by the nearest section of the anode which does not have the film between it and the cathode. This is the section marked X in FIG. 2. This added demand on this narrow region of the anode causes it to be utilized at a high rate and eventually it thins to the point of breaking. This electrically isolates the outside wrap 11A from the rest of the anode 11B. By varying the length of the film we can control the time during discharge that the anode will break. In order for this to work properly it is important that the taped end of the cathode and the section of the anode covered by the tab do not overlap.

When the cells of this embodiment are connected in series there is a slight possibility of thermal runaway of the cell during voltage reversal but not by the scenario which has been discussed previously. When a cell of this embodiment goes into reversal the anode 11 breaks at the point X in FIG. 2. The section of anode 11B is sufficiently thin that no dendrites can grow and cause an internal short. All of the anode 11B in the vicinity of the tab 13 gets consumed and the cell cannot pass any current. However, the terminals of the cell are still held in voltage reversal by the other cells in series. The cell container, typically made of stainless steel, begins to corrode due to the voltage being applied by the other cells in series. These corrosion products diffuse to the outside wrap of anode and are plated on it. As these corrosion products are plated they become dendritic and can cause a short between the cell can and the outside wrap of anode. This effectively reconnects the outer wrap of anode and it can now act as a reservoir again to plate anode material onto the cathode. By wrapping the outside of the spirally wound electrode package with an ionically impermeable film 15, as shown in FIG. 1, it prohibits the cell can corrosion products from diffusing to the outside wrap of anode and causing a detrimental short.

Figure 3:
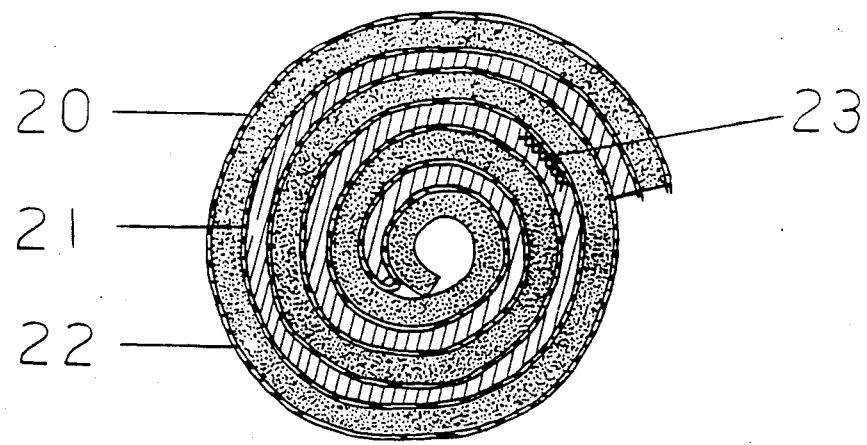
FIG. 3 is a cross section of a spirally wound electrode package of an alternate embodiment.

Another embodiment of this invention, depicted in FIG. 3, contemplates a cell in which the outer wrap is the cathode rather than the anode. This figure depicts the anode 21 and the cathode 22 which are essentially coterminus and the seperator 20 is interposed there between. The immunity to voltage reversal problems is afforded by locating the anode tab 23 on a section of the anode sandwiched on both sides by cathode as previously established. However, for this embodiment it is desirable to locate the tab as shown in FIG. 3 from performance considerations. The outer wrap of cathode 22 has anode on just one side. This outer wrap of cathode puts an additional demand on the anode opposite this section of cathode relative to the rest of the anode. This results in the outermost spiral of anode being consumed before the rest of the anode. Locating the anode tab on this section of the anode would electrically disconnect the bulk of the anode extremely early into discharge. Locating the anode tab 23 as shown allows a more complete realization of the cells capacity while maintaining the immunity to reversal problems.

The significance of these design features and the objectives of this invention will become clear in light of the following examples. It is understood that these examples are illustrative only and not meant to limit the invention.

Comparative Example A (Prior Art)

A total of 100 2/3A size lithium/manganese dioxide (Li/MnO$_2$) cells were built with an anode tab made of nickel and located on the outside wrap of anode (not shown). The MnO$_2$ cathodes were 9¼"×1"×0.015" and the lithium anodes were 10¼"×0.9"×0.006". The separator was 1 mil polypropylene and the electrolyte was 0.65M LiClO$_4$ PC/DME 2/1 (v/v). These were assembled into 50 6 V batteries with 1 cell of each battery deliberately being underfilled in order to simulate a leaking cell or a partially discharged cell. The normal electrolyte fill is 1.80 g while the underfilled cell has 1.54 g. When a deficient cell such as this is assembled into a battery it will always be driven into voltage reversal by the good cell. Specifically, by discharging these batteries across a 5 ohm load and insulating with R9 fiberglass insulation the deficient cell always goes into voltage reversal. The result of discharging the 50 prior art batteries in this fashion is given in Table 1.

TABLE 1

| Example # | # Reversed Cells | # Caught Fire | % Caught Fire |
|---|---|---|---|
| A | 50 | 10 | 20% |
| 1 | 70 | 2 | 3% |
| 2 | 30 | 0 | 0% |
| 3 | 45 | 0 | 0% |

EXAMPLE 1

This example uses cells identical in every way to those cells in the previous example except that anode tab is moved so that it is located 3" from the outside end of the anode. When these cells are spiral wound they result in the geometry shown in FIG. 1. The outside end of the cathode is masked on each side by ¼" of a nonporous adhesive tape which had a polyester backing and an acrylic adhesive*. This tape is both ionically impermeable and non-conductive. A total of 140 2/3A Li/MnO₂ cells were built in this fashion. These were assembled into 70 6 V batteries with 1 cell of each battery deficient in electrolyte as discussed in example 1. The result of discharging these batteries across a 5 ohm load and using R9 insulation is given in Table 1. This is clearly an improvement over the prior art.

*(3M Industrial tape #853)

EXAMPLE 2

The cells of this example are identical to those in example 1 except that the wound electrode package is wrapped with an ionically impermeable adhesive tape as shown in FIG. 1. A total of 60 2/3A size Li/MnO₂ cells were built in this fashion. These were assembled into 30 6 V batteries. One cell of each battery was deficient in electrolyte as in the previous examples. The result of discharging these batteries across a 5 ohm load and using R9 insulation is given in Table 1. This example demonstrates the effectiveness of the tape in preventing the plating of the cell can corrosion products onto the outside wrap of anode.

EXAMPLE 3

The cells of this example had an outside wrap of cathode as is shown in FIG. 3. The cathode dimensions were identical to those of the previous examples. The anode was 2.5" shorter than the previous examples and also 0.001" thicker so that the overall amount of active anode material is nearly the same as the previous examples. The anode tab was located 2.5" from the outer end of the shorter anode so that when spirally wound the tab would be located as shown in FIG. 3. A total of 90 2/3A size Li/MnO₂ cells were built in this fashion. These were assembled into 45 6 V batteries. One cell of each battery was deficient in electrolyte as in the previous examples. The result of discharging these across a 5 ohm load and using R9 insulation is given in Table 1.

These examples clearly demonstrate the impact of the anode tab location on the safety of a spirally wound cell during voltage reversal abuse. While the examples given are for lithium/MnO₂ cells the same results would be obtained for any anode/active cathode capable of being spirally wound. Suitable cathode materials include MnO₂, CFx, V₂O₅, WO₃, MoO₃, MoS₂, lead oxides, cobalt oxides, copper oxides, CuS, CuS₂, In₂O₃, iron sulfides, NiS, Ag₂CrO₄, Ag₃PO₄, TiS₂, transition metal polysulfides, and mixtures thereof. Suitable anode materials include alkali and alkaline earth netals such as lithium, sodium, potassium, calcium, magnesium, aluminum and alloys thereof.

It is understood that changes and variations in cell construction and the like can be made without departing from the scope of the invention as defined in the following claims.

What is claimed is:

1. A spirally wound electrochemical cell having improved abuse resistance comprising a container having therein a cathode, an anode consisting essentially of an anode metal comprising an alkali or alkaline earth metal, a separator, and a fluid electrolyte all in operative association with each other; each of said cathode, anode and separator having lengths substantially greater than their respective widths; and said anode, cathode and separator being spirally wound with said separator being positioned to maintain said anode and said cathode out of direct contact with each other, wherein said anode is comprised of first and second sections integral with each other but subject to different rates of utilization during discharge of said cell with said first section of anode being a minor part of said anode and being substantially completely discharged and depleted, during discharge of said cell, prior to completion of discharge and depletion of said second section of anode, with said second section comprising a major portion of said anode, and wherein said cell further comprises an anode tab located on said second section of the anode, whereby said discharge and depletion of said first section does not prematurely end the life of said cell.

2. A spirally wound electrochemical cell having improved abuse resistance comprising a container having therein a cathode, an anode consisting essentially of an anode metal comprising an alkali or alkaline earth metal, a separator, and a fluid electrolyte; said anode, cathode and separator being spirally wound with said separator being positioned to maintain said anode and said cathode out of direct contact with each other, wherein a first spiral section of anode is sandwiched between sections of cathode; and wherein a second section of anode has a section of cathode adjacent thereto only on one side thereof, with said first sandwiched section of anode being substantially completely discharged, during discharge of said cell, prior to completion of discharge of said second section of anode, characterized in that said cell further comprises an anode tab located on said first section of the anode which is sandwiched on both sides by sections of cathode whereby, upon said substantial completion of discharge of said first sandwiched section, said second section of anode is electrically disconnected from said anode tab.

3. The cell recited in claim 2 wherein a length of said anode extends outwardly in a circumferential sense approximately one revolution beyond the location of the anode tab.

4. The cell of claim 2 wherein the cathode has a piece of ionically impermeable and nonconductive film wrapped around the outermost end of the cathode with the length of said film being from 1/16" to 1" on each side.

5. The cell of claim 4 where the masked end of the cathode and the section of the anode covered by the tab do not overlap.

6. The cell of claim 5 wherein the wound electrode package has a piece of ionically impermeable and nonconductive film wrapped at least one revolution around the entire circumference of the package, the width of said film being approximately equal to the height of the wound electrode package.

7. The cell of claim 6 where the ionically impermeable and nonconductive film is selected from tapes with a backing of polyester, vinyl, cellophane, ultra-high molecular weight polyethylene, ultra-high molecular weight polypropylene, teflon, or teflon filled glass and an adhesive of acrylic, silicon, or rubber.

8. A spirally wound electrochemical cell with improved abuse resistance comprised of an anode consisting essentially of an alkali or alkaline earth metal and a cathode of solid cathode active material spirally wound with a separator there between such that at least one spiral of anode is sandwiched on both sides by cathode and an anode tab is located on a section of said anode that is sandwiched on both sides by said cathode and a length of said anode extends outwardly in a circumferential sense approximately one revolution beyond the location of said anode tab.

9. The cell of claim 8 where said cathode has a piece of ionically impermeable and nonconductive tape wrapped around the outermost end with the length of said tape being from 1/16" to 1" on each side of said outermost end.

10. The cell of claim 9 where the section of anode covered by the tab and the end of cathode masked by tape do not overlap.

11. The cell of claim 9 where the spirally wound electrode package is wrapped with at least one revolution of ionically impermeable and nonconductive tape and the width of said tape is approximately equal to the height of the spirally wound electrode package.

12. The cell of claim 11 where said tape has a polyester backing and an acrylic adhesive.

13. The cell of claim 12 where the cathode is selected from the group consisiting of $MnO_2$, $CFx$, $V_2O_5$, $WO_3$, $MoO_3$, $MoS_2$, lead oxides, cobalt oxides, copper oxides, $CuS$, $CuS_2$, $In_2O_3$, iron sulfides, $NiS$, $Ag_2CrO_4$, $Ag_3PO_4$, $TiS_2$, transition metal polysulfides, or mixtures thereof and the anode is selected from the group consisting of lithium, sodium, potassium, calcium, magnesium, aluminum or alloys thereof.

14. The cell of claim 12 where the anode is lithium and the cathode is $MnO_2$.

* * * * *